United States Patent [19]
Faulkner

[11] Patent Number: 5,752,481
[45] Date of Patent: May 19, 1998

[54] INJECTION VALVE ASSEMBLY FOR AN INTERNAL COMBUSTION ENGINE

[75] Inventor: Robert Bryan Faulkner, Odessa, Tex.

[73] Assignee: Valve Maintenance Corporation, Odessa, Tex.

[21] Appl. No.: 431,514

[22] Filed: May 1, 1995

Related U.S. Application Data

[63] Continuation-in-part of Ser. No. 136,894, Oct. 18, 1993, Pat. No. 5,431,140.

[51] Int. Cl.$^6$ .................... F02B 3/04; F02B 5/02; F02M 61/06
[52] U.S. Cl. .................... 123/294; 123/305; 123/531; 239/533.12
[58] Field of Search .................... 123/294, 305, 123/531, 532, 533, 534; 239/533.1, 533.2, 533.11, 533.12

[56] References Cited

U.S. PATENT DOCUMENTS

| | | | |
|---|---|---|---|
| 1,764,186 | 6/1930 | Teesdale | 137/533.15 |
| 2,274,968 | 3/1942 | O'Bannon | 137/533.13 |
| 2,555,803 | 6/1951 | Mashinter et al. | 239/533.12 |
| 3,059,667 | 10/1962 | Coceano | 137/533.15 |
| 4,006,719 | 2/1977 | Kanda et al. | 123/531 |
| 4,096,832 | 6/1978 | Casull et al. | 123/267 |
| 4,246,002 | 1/1981 | Bell | 137/533.13 |
| 4,301,825 | 11/1981 | Simko | 123/275 |
| 4,338,897 | 7/1982 | Drumheller et al. | 123/267 |
| 4,341,351 | 7/1982 | DeLuca | 239/533.12 |
| 4,365,756 | 12/1982 | Fisher | 239/533.2 |
| 4,633,830 | 1/1987 | Oshima et al. | 123/262 |
| 4,736,718 | 4/1988 | Linder | 123/267 |
| 4,867,128 | 9/1989 | Ragg et al. | 123/305 |
| 4,884,539 | 12/1989 | Ciccarone et al. | 123/310 |
| 5,146,904 | 9/1992 | Olson et al. | 123/533 |
| 5,150,690 | 9/1992 | Carter et al. | 123/527 |
| 5,172,865 | 12/1992 | Takano et al. | 123/531 |
| 5,211,145 | 5/1993 | Ichikawa et al. | 123/305 |
| 5,222,993 | 6/1993 | Crane | 123/256 |
| 5,241,930 | 9/1993 | Dupler | 123/169 PA |
| 5,285,756 | 2/1994 | Squires | 123/294 |
| 5,355,854 | 10/1994 | Aubee | 123/527 |
| 5,390,651 | 2/1995 | Nussbaum et al. | 123/694 |
| 5,421,306 | 6/1995 | Talaski | 123/510 |
| 5,431,140 | 7/1995 | Faulkner | 123/254 |

FOREIGN PATENT DOCUMENTS 1044470  11/1991  France .................... 123/267

OTHER PUBLICATIONS 1679.012—U. S. application No. 08/431,515 filed May 1, 1995, Copending application entitled System for Improving Exhaust Emission Quality of and Internal Combustion Engine.

1679.011—U. S. application No. 08/431,516 filed May 1, 1995, Copending application entitled Pilot Fuel Line Check Valve Assembly for a Precombustion Chamber of an Internal Combustion Engine.

*Primary Examiner*—Willis R. Wolfe
*Attorney, Agent, or Firm*—Novak Druce & Burt

[57] ABSTRACT

Apparatus and method for modifying existing internal combustion engines that fail to meet current air quality standards so as to bring such engines into compliance. The invention includes the provision of an injection valve assembly for the engine's cylinders that promotes mixing of injected fuel with air present in the cylinder by establishing a cyclonic jetting action in the fuel upon its introduction into the cylinder. The assembly includes a piston and cartridge that are configured for reciprocating engagement, one with the other. The cartridge has channels that impart a rotational spin on pressured gas as it is directed out of the assembly. At least two fuel distribution patterns are created; one that is focused, much like a beam and another that is flared into a conical pattern.

17 Claims, 11 Drawing Sheets

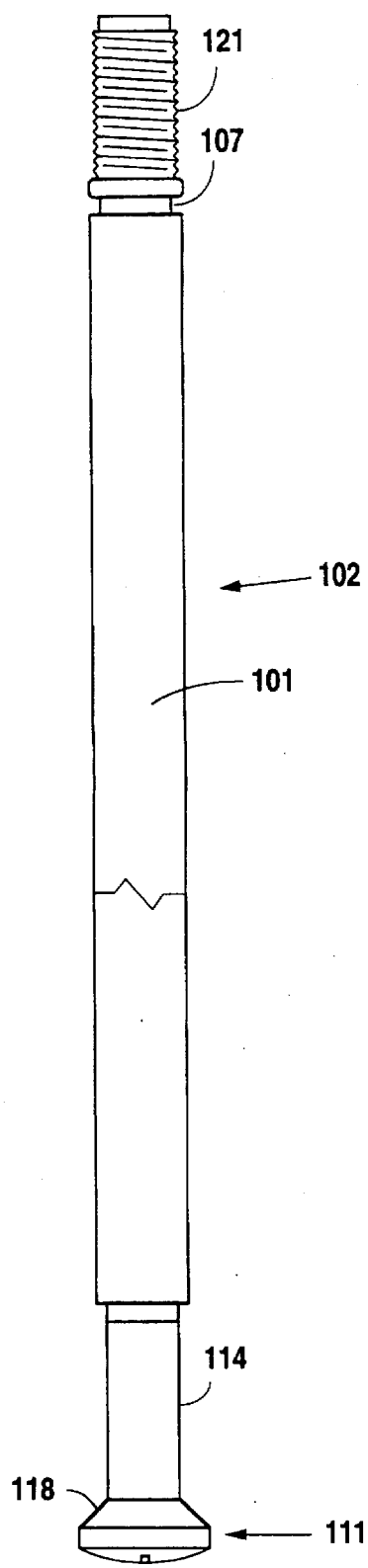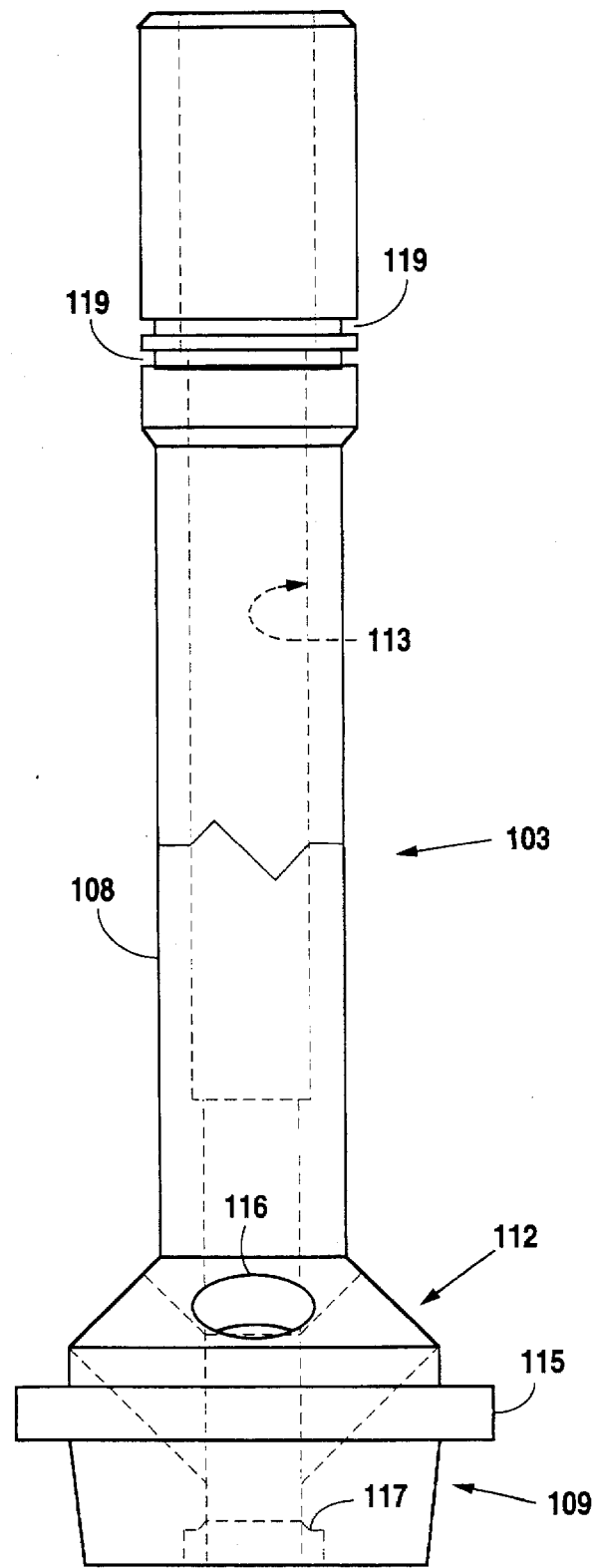

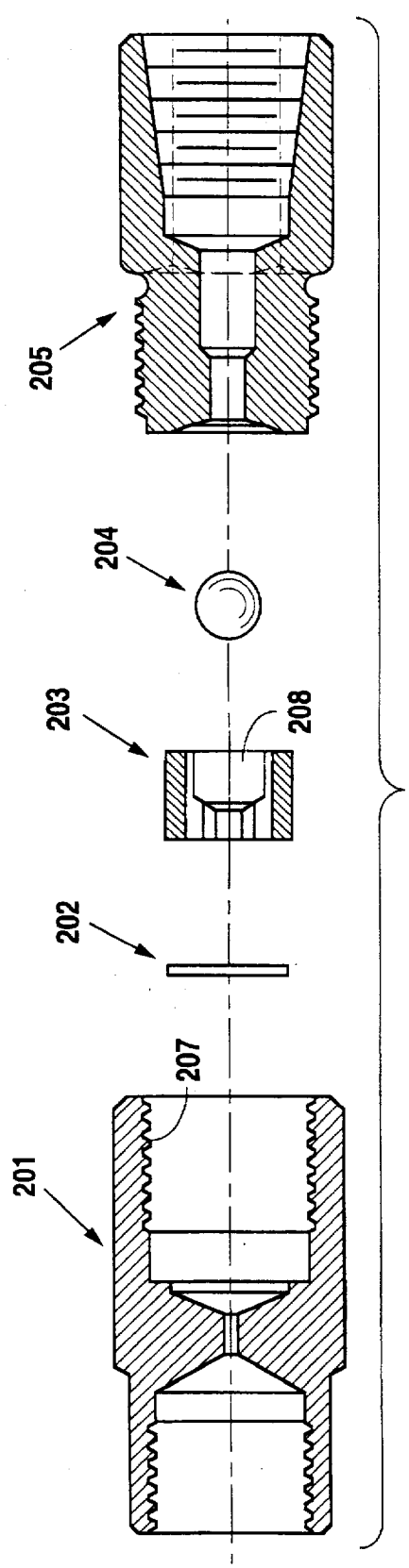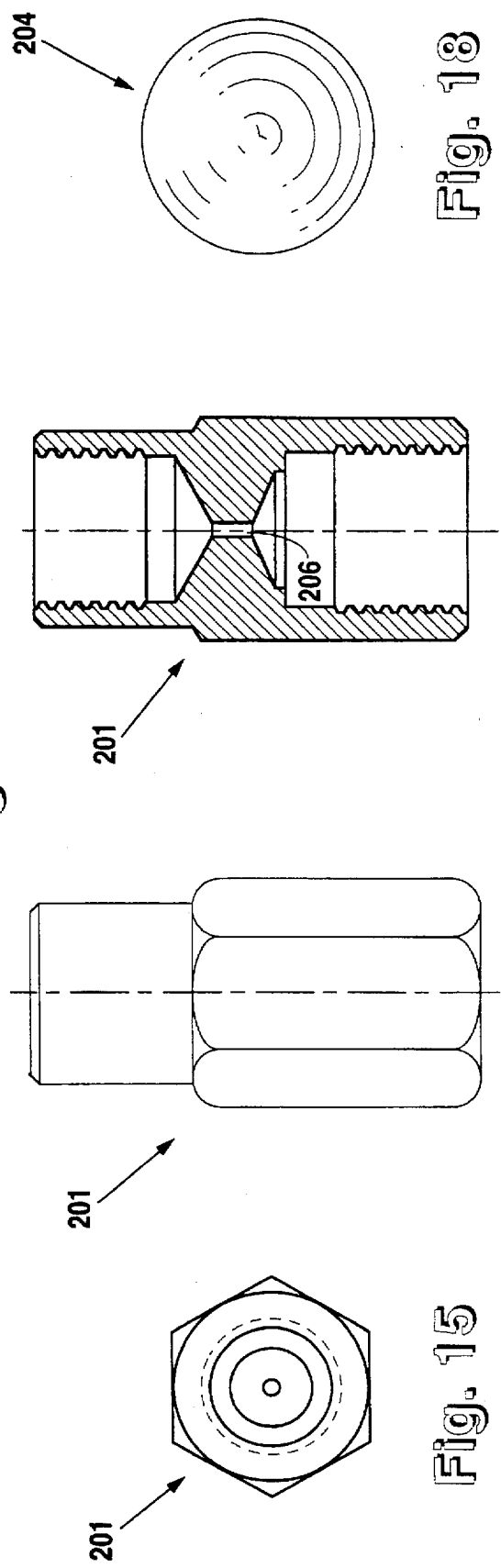

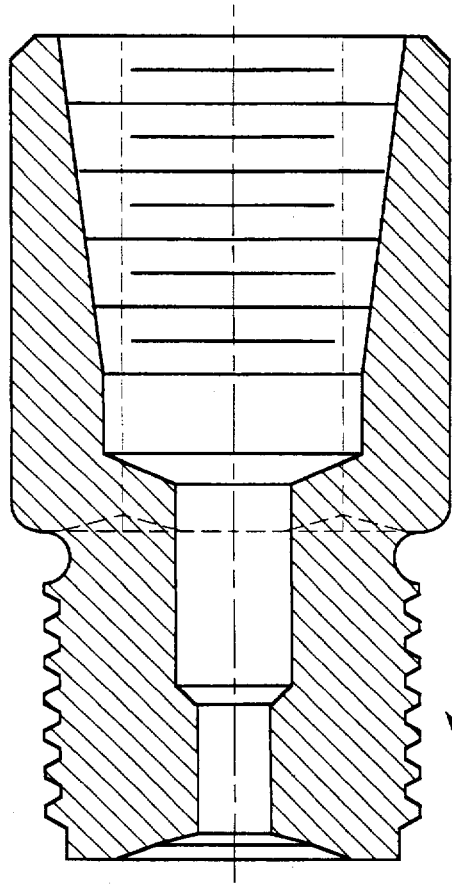
Fig. 20
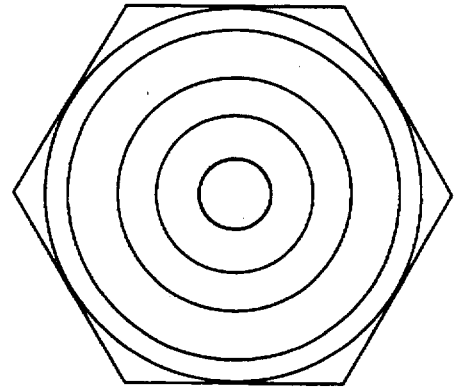
Fig. 19
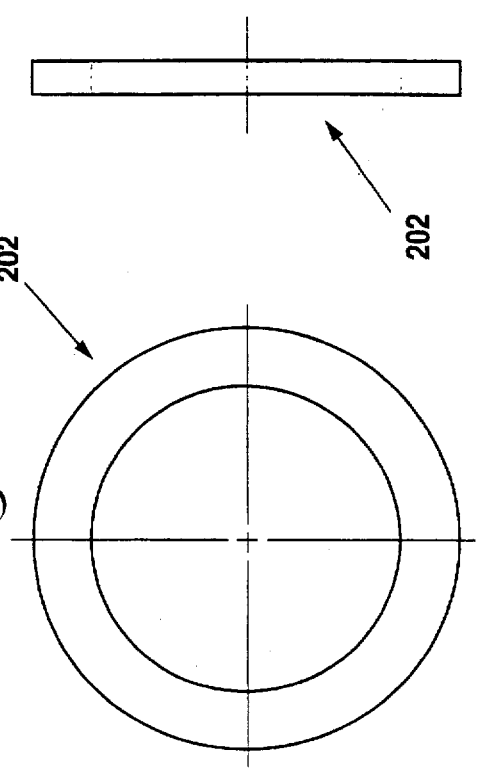
Fig. 25
Fig. 24
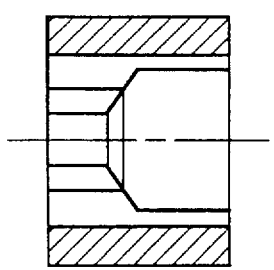
Fig. 23
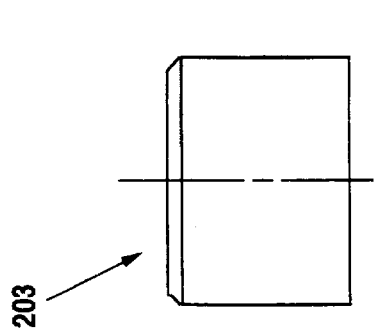
Fig. 21
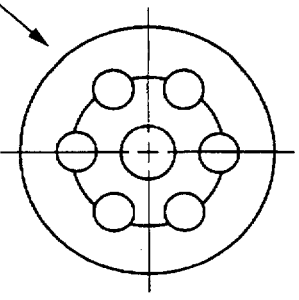
Fig. 22

INJECTION VALVE ASSEMBLY FOR AN INTERNAL COMBUSTION ENGINE

This application is a continuation-in-part of the U.S. application having Ser. No. 08/136,894 filed Oct. 18, 1993 and entitled CLEAN BURNING PRE-COMBUSTION CHAMBER SYSTEM AND METHOD FOR INTERNAL COMBUSTION ENGINES, now U.S. Pat. No. 5,431,140.

FIELD OF THE INVENTION

The present invention relates generally to systems installable upon internal combustion engines for improving the efficiencies of those engines with respect to exhaust emissions and fuel economy. More particularly, it relates to systems that are installable as after-market or retro-fit equipment to existing internal combustion engines that produce excessive exhaust emissions.

BACKGROUND OF THE INVENTION

Internal combustion engines of all types have come under closer scrutiny and regulation as a result of a heightened awareness of their impact on air quality. Like many other industries, the natural gas pipeline industry has been affected and required to investigate alternative means for reducing emissions. The pipeline industry is comprised of a number of companies that control and utilize a nationwide grid of interconnected gas pipelines. The companies act as carriers for natural gas producers by transporting natural gas through their pipeline networks from the producers to consumers. Most, if not all of these pipeline companies use natural gas fired internal combustion engines to drive compressors at pumping stations that pump the gas through the pipelines. A large number of these engines are "dirty", slow speed, reciprocating engines manufactured prior to 1970. For purposes of this disclosure, an engine will be considered "dirty" if it produces emissions in excess of regulated limits. Therefor, other types of engines may also be classified as "dirty" if they produce prohibitively high levels of harmful pollutants. Examples of other types of internal combustion engines that may be considered dirty are diesel and gasoline engines if their emission levels are too high. As a result, benefits of the several features of the present invention may also be realized in these different types of internal combustion engines if suitably modified.

Emissions standards mandated under the National Clean Air Act, and equivalent or even more restrictive standards that are mandated under a number of individual State Clean Air Acts may render some of these engines obsolete and unusable unless they can be modified for compliance. In the absence of modification, the only other alternative available to the engine's operators is to run them at reduced power levels to reduce the relative produced pollutants. The inadequacies of reducing power levels, however, prevent it from being a viable solution for the operators.

The natural gas pipeline operators have attempted compliance by reducing the amount of fuel supplied to the compressor engines in the hope of commensurately lowering emission levels. Instead of supplying 100% of the stream of fuel that the engine was designed to burn at peak operation, the operators are cutting back to something less than that. While the amount of fuel is reduced, the same amount of air is supplied to the engine. The result is a leaner fuel mixture that results in a more complete burn of the fuel. It also results in a dilution of the fuel mixture and exhaust gas. Therefore, emissions are reduced as a result of the more thorough burn of the fuel and air dilution of the exhaust. A problem arises, however, because the engines now produce less power because of the reduced amount of fuel being supplied. The power reduction affects the systems to which the engines are supplying power because those systems are typically designed to demand close to 100% capacity of the engines, at least during intermittent peak times. Therefore, in the example of natural gas compressors that are being powered by these engines, there may be times when full power from the engines is required, but not available. The reduction in available power hurts the operator far more in lost revenue than does the fuel savings experienced because of reduced consumption. At the same time, all non-variable costs of operation remain the same. Furthermore, the engine runs for the same amount of time, therefore maintenance is not significantly reduced. Similarly, fixed overhead costs remain the same while revenues are down. In view of these detrimental effects, it is a common desire of the operators to have 100% power capabilities, and therefore the same amount of fuel must be supplied, but with reduced exhaust emissions.

Internal combustion engines that use high volatility fuels such as diesel, gasoline or natural gas, among others, have traditionally relied upon conventional spark systems, or variations thereof for ignition purposes. For simplicity, all such engines are going to be discussed herein as they relate to natural gas fueled internal combustion engines, but it should be understood that the applications and consequences described herein may be applied to most, if not all types of internal combustion engines. Spark ignition systems provide adequate ignition energy for most internal combustion engine operating conditions and are particularly effective when the engine is operating at or near full load. For certain engines, however, particularly large, static, natural gas fired engines, traditional spark ignition systems prove inadequate when these engines are operating at less than full load. During operations at less than peak capacity, many fuel governing systems automatically lean out the fuel/air mixture supplied to the engine's cylinders. This produces a fuel mixture with a high ratio of air to fuel. Often times, traditional spark ignition systems do not provide sufficient ignition energy, or fire power to ignite such lean mixtures. As a result, large natural gas fired engines operating at lean mixtures tend to experience detonation, misfire, poor fuel economy, and higher emissions of $NO_x$ such as nitric oxide NO and nitrogen dioxide $NO_2$.

Among other reasons for producing high levels of noxious emissions, the volatile fuel portion of the mixture may not be completely ignited in each cycle of the engine. Therefor, unburned fuel will be expelled from the engine in the exhaust that results in environmental pollution.

One method for countering the undesirable effects of operating large gas fired engines at lean mixtures involves the use of a pre-combustion chamber, often referred to as a torch ignition source. In most embodiments, the pre-combustion chambers are of significantly reduced volume compared to the volume of the engine cylinder that is to be fired or ignited. In operation, pre-combustion chambers typically intake a rich fuel/air mixture and ignite it using an ordinary spark plug. The result is a burning fuel mixture that is thrust out an exhaust port of the chamber into an engine cylinder at high velocity, much like a blow torch. The high velocity flame has greater ignition capacity than a spark plug and is therefor capable of more completely igniting lean fuel\air mixtures within the cylinder.

In typical pre-combustion chambers, pilot fuel is provided to the pre-combustion chamber to enrich the fuel-air mixture therein, which is then ignited via a spark plug. The resulting detonation within the pre-combustion chamber then provides the above-described blow torch effect to completely ignite the fuel-air mixture in the engine cylinder.

With respect to these internal combustion engines, it has been found that not only the means by which the fuel is ignited within an engine's cylinder effects the burn efficiency of the fuel/air mixture, but also the way in which the fuel and air are introduced into the cylinder and mixed therein effects burn efficiency. To achieve the most complete ignition of the volatile components of the fuel mixture, it is important that the constituents be thoroughly mixed.

In known systems, particularly those employed in the gas pipeline industry, natural gas is introduced into an engine cylinder at a relatively low pressure, and typically at or near the top of the cylinder. As has been schematically illustrated in FIGS. 2, 4, 8, and 9, currently known methods for introducing natural gas into an engine's cylinder includes an injection valve assembly having a valve piston with a generally flared or bell shaped distributor head. When the valve piston is depressed, a gas port is opened and fuel gas is supplied to the cylinder through gas supply channels. Regarding the gas supply channels depicted in the referenced figures, their longitudinal axes are perpendicular to the longitudinal axis of the valve piston and cartridge from a radial perspective about the long axis of the piston and cartridge. In this configuration, the fuel gas is directed straight at the shaft of the piston, though at a slightly downward tilt.

When the fuel gas is supplied at a typical pressure of about 25 psi, it does not "jet" down into the cylinder, but instead tends to "roll" about the walls of the cylinder and remain at least partially localized about the top end of the cylinder. Air is introduced into the engine cylinder through an air inlet located at a position below the gas inlet and generally above the power piston. During the up-stroke of the power piston, the supplied air is forced upward toward the injected gas. Due to flow phenomenon, the air and gas phases tend to press against one another without a great deal of mixing between the two phases. This failure to mix results in the incomplete burn of the fuel gas upon ignition during the power-stroke of the piston. When the spent contents of the cylinder are exhausted, an unacceptably high level of unburned fuel is included and is considered to be a pollutant. Apparatus and methods by which a more thorough mixing of the air and fuel within the cylinders of an internal combustion engine may be accomplished have been recognized as providing potential solutions for reducing the pollutant content of the exhaust.

Such apparatus and methods are accommodated by a current rebuilding practice already employed in the natural gas pipeline industry on the engines used to compress and pump natural gas. The original designs for the injection valve assemblies have a substantially solid outer housing or cylinder in which the valve piston reciprocates. An interior wall of the housing is configured to facilitate and cooperate with the piston's action. After time, the interior surface of the outer housing wears to a degree that proper cooperation between the valve piston and housing is not possible. As a remedial measure, the housing is cylindrically bored and a replacement cartridge is installed within the bore. The replacement cartridge has an exterior that is fixably engagable with the newly bored cylindrical interior of the housing and an interior that matches what used to be the interior surface of the housing. Either the old valve piston, or a new one is then installed in the new cartridge for reciprocation therein and resumed operation. Subsequently, when the replacement cartridge wears significantly, it is merely replaced by another. At this time, these replacement cartridges are commercially available and compatible with most large engines utilized in the natural gas pipeline industry for compression purposes. The improved injection valve assemblies of the present invention are readily accommodated in existing internal combustion engines since many, if not most of the existing housings have been previously bored.

Based on current estimates, the cost to replace one existing "dirty" engine employed in the gas pipeline industry with a newer "clean" engine would exceed two million dollars ($2,000,000.00). Replacement of all "dirty" engines in the nationwide natural gas pipeline network would require an investment of potentially billions of dollars. Therefore, all means by which presently existing engines may be modified to meet the new emissions standards are being actively explored.

A need obviously exists for alternative systems and methods of modifying existing dirty engines to reduce harmful exhaust emissions. Such systems and methods preferably require little modification of the existing engine cylinders and should be relatively inexpensive. Additionally, the systems should be reliable and capable of long service lives. Still further, they should require minimal engine down time to install and should result in substantial emission reductions for the engines so modified.

SUMMARY OF THE INVENTION

In the practice of the present invention, several means disclosed herein may be employed, either singularly or in combination, to improve the quality of an internal combustion engine's emissions, and as an additional benefit, the engine's efficiency. The improvements of the present invention include providing pre-combustion chambers to the cylinders of the engine. As a compliment to the pre-combustion chambers, a specially designed check valve is disclosed that potentiates the chamber's performance. Additionally, a unique design is disclosed for an injection valve assembly for the engine's cylinders that promotes mixing of injected fuel with air present in the cylinder by establishing a cyclonic jetting action in the fuel upon its introduction into the cylinder.

One or more pre-combustion chamber systems may be employed on each cylinder of the engine. Each such chamber is water-cooled, sized and equipped with male threads to screw into one of the spark plug holes in the cylinder head. Most such engines have two spark plug holes per cylinder. As a result, the use of two pre-combustion chambers per cylinder allows each chamber to be relatively compact and still achieve a volume ratio between total chamber volume and engine cylinder volume in the range including, but not limited to approximately 17:1 to 24:1. This range is considered to include the optimum ratios for effective use of a pre-combustion chamber. The use of water cooling allows the dual chambers to be relatively thin walled, permitting them to fit within a standard spark plug access hole. At the same time, the chambers are capable of providing a long useful service life. A specially shaped interior ignition chamber includes no sharp corners or edges, thus improving fuel and air flow and virtually eliminating troublesome and dangerous engine "knocking" which is generally associated with pre-combustion chambers.

The performance of the pre-combustion chambers is enhanced by the inclusion of a specially designed check valve positioned in-line with the pilot fuel supply line of the chamber. In the preferred embodiment, and that which is illustrated in FIG. 14 by an exploded cross-sectional view, the check valve takes the form of a ball check valve. The body of the check valve is drilled so that an aperture or channel of known characteristics is provided therethrough. The dimensions of the aperture or channel control the amount of fuel delivered to the pre-combustion chamber to optimize its performance. The appropriate dimensions may be established based on several known variables. These variables may include, among others, the pressure at which pilot fuel is provided to the check valve assembly, the volume of the pre-combustion chamber and the pressure experienced within the chamber when accepting pilot fuel through the pilot fuel line. With this information known, the appropriate size of an optimizing aperture or channel may be calculated and then established.

The check valve also restricts reverse flow therethrough when a higher back pressure is experienced in the chamber than in the pilot fuel line. Without the check valve, contents from the pre-combustion chamber, and possibly even the engine's cylinder could back wash into the fuel supply. Furthermore, the check valve assures that the effects of the ignited contents of the chamber are directed into the engine's cylinder. Because the dimensions and characteristics of the pre-combustion chambers and the systems in which they are included may vary, it is contemplated that the check valves may be variously calibrated and sized as required.

Another feature of the present invention relates to an improved design for the injection valve assembly used to inject combustible fuel into the engine cylinder. The design of the injection assembly has been modified to promote a more thorough mixing of the injected fuel gas with the supplied air within the cylinder. The jetting effect produced by the redesign of the valve assembly is enhanced by increasing the pressure at which the gas is delivered through the valve assembly. Previously known assemblies, such as those illustrated in FIGS. 2 and 4, delivered the gas fuel to the cylinder at about twenty-five pounds of pressure per square inch (25 psi). The improved injection valve of the present invention delivers fuel at greater pressures. It is contemplated that the elevated pressure may fall within the range of 45 to 60 psi, but may be more or less depending upon characteristics of the engine upon which the conversion is being made.

As previously discussed, an efficient and complete combustion of the fuel/air mixture is at least partially dependent upon successful mixing of the two components. The improved injection valve assembly disclosed herein includes a modified injection valve cartridge and injection valve piston that together cooperate to "jet" the supplied fuel stream into the interior body of the engine cylinder. By so doing, the fuel is more thoroughly mixed with the air within the cylinder providing a more homogeneous fuel/air mixture that readily and completely ignites. It is contemplated that the now more thoroughly mixed solution of fuel and air may be ignited by a conventional spark system, but more advantageously may be ignited by the torch effect of the improved pre-combustion chamber disclosed herein.

FIGS. 3 and 5 illustrate two embodiments of the improved valve assembly and the resulting jetting pattern of the injected fuel that is achieved. In FIG. 3, an embodiment is depicted in which an annulus is created between the head of the valve piston and the interior of the lower end of the cartridge. As shown, when the piston is extended, fuel is allowed to jet substantially downwardly into the center of the engine cylinder. As the fuel is jetted into the cylinder, it mixes with the air that is being forced upwardly by the reciprocating power piston. The jetting effect prevents the fuel gas and air from developing into layered phases that do not readily mix. Instead, the fuel jet is directed into the air phase and cooperates with the natural flow patterns developed by the movement of the power piston to encourage mixing.

The alternative embodiment of FIG. 5 shows a flared gas port in the cartridge that substantially matches the flared head of the valve piston. A jetting effect on the gas is also achieved by this configuration, but the distribution pattern is less concentrated. The desired effect of more thorough mixing between the fuel and air is, however, similarly achieved.

In each of the described embodiments, the jetting effect has been achieved by significantly reducing the cross-sectional area of the openable gas port between the valve piston and cartridge. During each cycle of the injection process, the same amount of fuel must be delivered to the engine's cylinder to produce the expected amount of power. Since the area of the gas port has been reduced, the gas pressure must be increased to force the same amount of fuel gas through the reduced passage in the same amount of time. To enhance the compatibility of the improved injection valve assembly to existing engines, the replacement valve assemblies are designed and calibrated to function within the same timing parameters as the original assemblies. To appreciate this feature more fully, it should be understood that a common method for establishing the amount of fuel delivered to a particular cylinder during each injection cycle includes a rocker arm that depresses the valve piston into the open position for a certain proportion of each revolution of a driving cam-shaft. During the balance of the revolution of the cam shaft, a spring biases the valve piston to a closed position. If the delivery pressure of the fuel gas to the original valve assembly is known, together with the original cross-sectional area of the gas port, then the required delivery pressure to the new valve assembly having a gas port of known cross-sectional area may be calculated. As an example, the valve piston may be depressed for thirty degrees of rotation of a cam shaft, and each revolution of the cam shaft may establish one injection cycle for the cylinder. Therefore, the injection valve is open for (30 degrees)/(360 degrees), or one-twelfth of each rotation. Based on the speed of revolution of the cam shaft, the cycle speed and time period during which the valve is open may be established. When the improved injection valve assembly of the present invention is installed that has a gas port of different cross-sectional area when open, it is known that the same amount of fuel must be delivered in the same amount of open time. Therefore, the required pressure to achieve this is calculated and then delivered. While it is contemplated that the cam shaft and rocker arm configuration may be employed, the open duration of the valve assembly may also be electronically or otherwise suitably actuated and controlled.

The forceful jetting of the fuel into the air achieves the desired mixing of the fluid components because of their forced commingling and turbulent mixing. The turbulent mixing effect of the fuel jet is enhanced by a design variation within the cartridge. As may most clearly be seen in FIGS. 12 and 13, the gas supply channels through the body of the valve cartridge are not radially oriented to the center bore of the valve cartridge, but are instead at a slight angle to perpendicular. This slight angle, together with the downward tilt of the channels, causes a "spin" to be imparted upon the fuel gas thereby tending to dispense the gas in a spiral from the gas port. This spinning or "cyclone" effect enhances the mixing capabilities of the fuel jet as it enters the cylinder and mixes with the air.

One embodiment of the present invention includes an injection valve assembly installable upon a cylinder of an internal combustion engine. The injection valve assembly has an injection cartridge sealingly installable within a bore of an outer housing. In some circumstances, the outer housing will take the form of a sleeve, possibly cylindrical in shape. There is an injection piston installable within a center bore of the cartridge for reciprocating (up and down) relative motion therein. The injection piston is also configured for sealing engagement with the cartridge. The injection piston has a piston shaft and a piston head. The cartridge center bore has a recess within which the piston head reciprocates between a closed position in which a sealing surface of the piston head sealingly engages a sealing seat of the cartridge and an open position in which the sealing surface of the piston head is disengaged from the sealing seat of the cartridge. In the open position, a gas port is formed through which supplied pressured gas may pass. The cartridge recess and the piston head create a substantially cylindrical annulus between one another so that pressured gas passing through the gas port and the annulus is jetted in a concentrated fuel stream in a direction substantially parallel to a length of the injection assembly.

The injection cartridge also includes a plurality of gas supply channels extending downwardly from an exterior of the cartridge to the center bore of the cartridge. Each channel is uniformly canted slightly from a radial orientation. The canted orientation causes pressured gas passing through the channels to have a rotational component imparted thereto so that the concentrated fuel jet is cyclonic.

In one embodiment, there are at least five gas supply channels in the cartridge. In the illustrated embodiment, each channel is canted at a six degree angle to a radial orientation.

The piston shaft has a reduced diameter adjacent to a lower internal end of the channels that establishes an expanded annulus space between the piston shaft and the cartridge at the channel's lower end. This facilitates the passage of gas from the channels to the gas port.

The injection cartridge is configured to create a gas reservoir at an exterior surface of the cartridge. The reservoir is in fluid communication with the channels and with a pressured gas source.

The shaft of the piston also includes a threaded top end for screwable engagement with an actuator that reciprocates the piston within the cartridge.

The shaft of the piston also includes an o-ring recess proximate to a top end of the piston for receiving an o-ring that slidingly and sealingly engages an interior surface of the cartridge during reciprocation of the piston within the cartridge.

In another embodiment, instead of having a cylindrical annulus created between the piston and cartridge, the cartridge recess and the piston head create a flared annulus between one another so that pressured gas passing through the gas port and the annulus is jetted in a conical pattern away from the injection assembly into the engine's cylinder. In most other respects, the two embodiments are similar.

The present invention also includes a method of injecting fuel into a cylinder of an internal combustion engine to promote mixing of the injected fuel and air present in the cylinder for a more complete ignition of the fuel and air. The steps of the method include supplying pressured fuel to an injection valve assembly at a pressure of at least 30 psi. The pressured fuel is then passed through an annulus of restricted cross-sectional area created between the injection piston and the injection cartridge. A stream of the pressured fuel is jetted away from the injection valve assembly and into the cylinder. Upon so doing, the jet penetrates a phase of air that is present in the cylinder. The pressured fuel is then turbulently mixed with the air to form a more homogeneous solution from the two components, fuel and air.

In one embodiment a focused jet stream is established in the pressured fuel. The focused jet stream is directed away from the injection assembly in a direction substantially parallel to a length of the injection assembly.

In another embodiment, a flared jet stream of pressured fuel is established and that flared jet stream is directed away from the injection assembly so that a conical shaped dispersion pattern is developed as the stream progresses into the cylinder.

In the situation of both the concentrated and flared embodiments, a rotational component is imparted to the jet stream of pressured fuel so that a cyclonic effect is established as the jet stream progresses into the cylinder.

In another aspect of the present invention, a check valve assembly for the pilot fuel line of a pre-combustion chamber of an internal combustion engine is provided. The assembly includes a check valve body having a cavity defined therein. There is a spacer that is insertable into the cavity of the check valve body. The spacer has a cage defined at its interior. A ball is retainable in the cage for limited movement therein. A check valve connector is connectable to the check valve body for retaining the ball within the cage. There is also a check valve orifice extending through the check valve body. The check valve orifice is sized to assure delivery of a proper amount of pilot fuel to the pre-combustion chamber based upon characteristics of the chamber and the engine upon which the chamber is employed.

The check valve assembly additionally includes a check valve gasket positioned between the spacer and the check valve body for creating a seal therebetween.

The ball is a 6 millimeter silicon nitride ball.

The connector has a lapped face for sealing engagement with the ball.

The spacer is lapped to adjust the lift distance of the ball.

In a further embodiment, the check valve assembly described hereinabove additionally includes a pre-combustion chamber. The pre-combustion chamber has a generally cylindrical housing with a male threaded adaptor at the base of the housing. The adaptor is sized to fit within a female spark plug hole on the engine's cylinder. A generally cylindrical interior chamber within the housing has rounded upper and lower surfaces. The rounded lower surfaces communicate with the interior of the male threaded adaptor in a taper toward the spark plug hole. There is a female threaded adaptor positioned in the top of the housing to accommodate an ignition spark plug.

Still further, the pre-combustion chamber includes a cooling water reservoir positioned within the housing so that it surrounds the interior chamber. The cooling water intake and return fittings are connected between the reservoir and the exterior of the housing.

The pre-combustion chamber also includes a sleeve attached thereto. The sleeve has a diameter and length that permits the sleeve to be contained predominantly within the spark plug access bore when attached to the pre-combustion chamber. A top end of the sleeve protrudes out of the spark plug access bore to permit the attached pre-combustion chambers to be readily threaded into the spark plug holes in the engine.

In yet another embodiment of the presently disclosed invention, a system for improving the exhaust emission quality of an internal combustion engine by modification to the engine's cylinders is described. The internal combustion engine includes at least one cylinder adapted to receive at least one pre-combustion chamber that is fluidly connected to an interior space of the cylinder at a spark plug hole. Also included is an injection valve assembly that is connected to the cylinder for selective fluid communication with the cylinder's interior space. The injection valve assembly has an injection piston that is installed within a center bore of the cartridge for reciprocating relative motion therein and sealable engagement therewith. Furthermore, the piston has a piston shaft and a piston head. The center bore of the cartridge has a recess within which the piston head reciprocates between a closed position in which a sealing surface of the piston head sealingly engages a sealing seat of the cartridge and an open position in which the sealing surface of the piston head is disengaged from the sealing seat of the cartridge. In the open position, a gas port is formed through which supplied pressured gas may pass. The cartridge recess and the piston head create an annulus between one another so that pressured gas passing through the gas port and the annulus is jetted into the cylinder for turbulent mixing with air present therein.

As previously described, these modifications may include a configuration in which the cartridge recess and the piston head form a substantially cylindrical annulus so that pressured gas passing through the gas port and the annulus is jetted in a concentrated fuel stream in a direction substantially parallel to a length of the injection assembly into the interior space of the cylinder. Alternatively, the annulus between the cartridge recess and the piston head may be flared so that pressured gas passing through the gas port and the annulus is jetted in a flared pattern away from the injection assembly into the interior space of the cylinder.

The features described hereinabove with respect to the injection valve assemblies and pre-combustion chambers also apply to these alternative embodiments.

Optionally, a ball check valve assembly as previously described may be included with the injection valve assembly and pre-combustion chamber modifications. The specifics of an included check valve are similar to those also disclosed previously, hereinabove.

A method for improving the exhaust emission quality of an internal combustion engine by modifications to the cylinders of the engine is also disclosed. The method of modification includes installing a pre-combustion chamber in a spark plug hole of a cylinder. Fuel is then injected into the cylinder under sufficient pressure to promote mixing of the injected fuel and air present in the cylinder for a more complete ignition of the fuel and air. The step of injecting fuel into the cylinder includes supplying pressured fuel to an injection valve assembly. The pressured fuel is passed through an annulus of restricted cross-sectional area created between an injection piston and an injection cartridge. This results in a jetting of the pressured fuel away from the injection valve assembly and into the cylinder. As the fuel is jetted into the chamber, it penetrates a phase of air that is present in the cylinder. The penetration causes a mixing of the pressured fuel turbulently with the air.

As one embodiment, during the jetting process, a focused jet stream of pressured fuel is established. That focused jet stream of pressured fuel is directed away from the injection assembly in a direction substantially parallel to the length of the injection assembly.

In an alternative embodiment, a flared jet stream of pressured fuel is established. It is directed away from the injection assembly so that a conical shaped dispersion pattern is developed as the stream progresses into the cylinder.

It is additionally contemplated that a rotational component may be imparted to the jet stream of pressured fuel so that a cyclonic effect is established as the jet stream progresses into the cylinder.

It is also contemplated that the pressured fuel will be supplied at a pressure of at least 30 psi to the injection assemblies.

Additionally, a ball check valve assembly may be connected in a pilot fuel supply line of the pre-combustion chamber.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE DRAWINGS

FIG. 6 is a perspective view of the injection valve piston.

FIG. 7 is a perspective view of the injection valve cartridge with interior features shown in phantom.

FIG. 14 is an exploded sectional view of the ball check valve assembly.

FIG. 15 is an end view of the check valve body.

FIG. 16 is a side view of the check valve body.

FIG. 17 is a cross-sectional view of the check valve body.

FIG. 18 is a perspective view of the 6 mm diameter ball of grade 5 silicon nitride.

FIG. 19 is an end view of the check valve connector.

FIG. 20 is a cross-sectional view of the check valve connector.

FIG. 21 is a side view of the check valve spacer.

FIG. 22 is an end view of the check valve spacer.

FIG. 23 is a cross-sectional view of the check valve spacer.

FIG. 24 is an end view of the check valve gasket.

FIG. 25 is a side view of the check valve gasket.

DETAILED DESCRIPTION OF THE PREFERRED EMBODIMENTS

Figure 1:
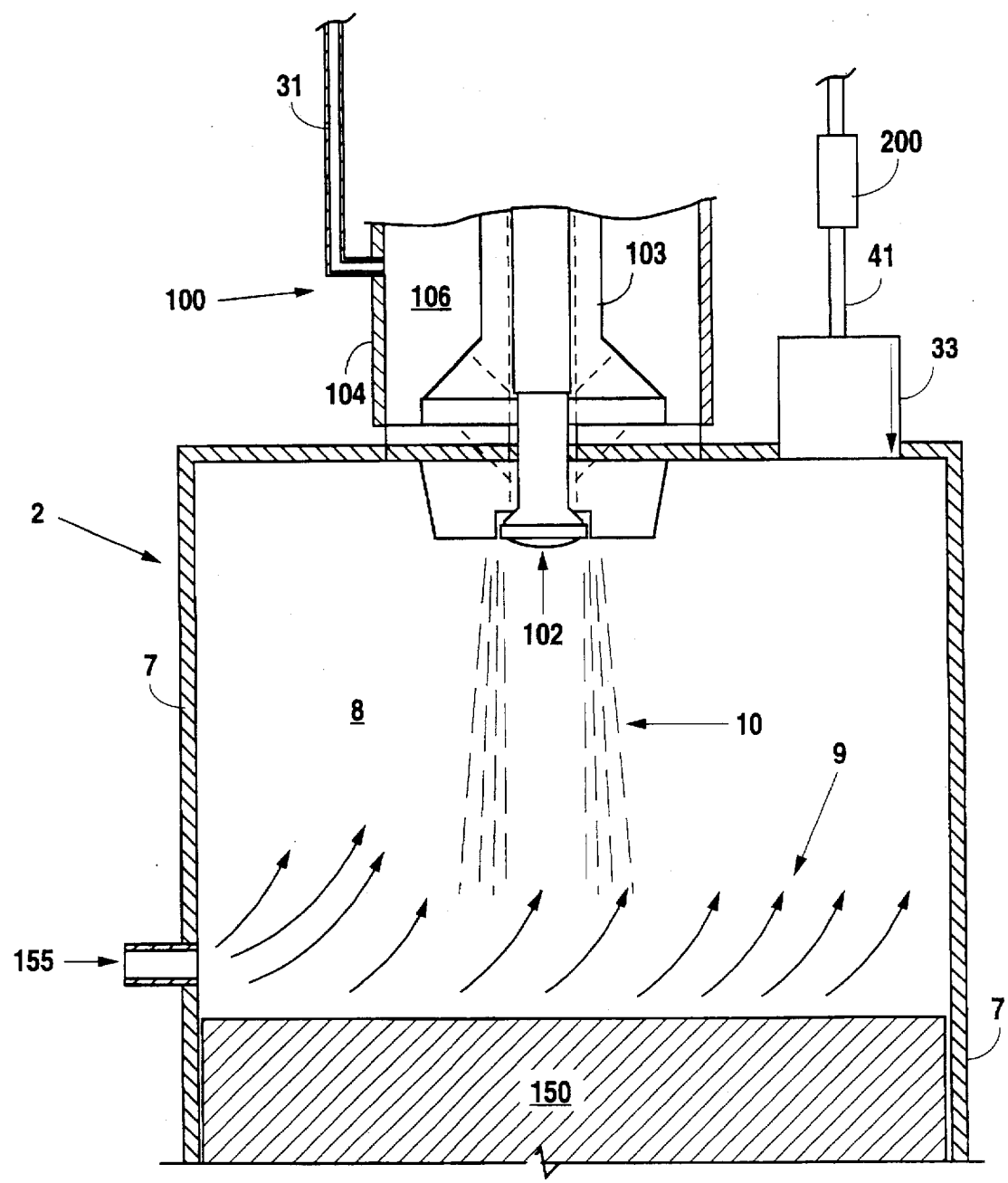
FIG. 1 is a schematic illustration of the present invention showing the several improvements on an internal combustion engine's cylinder; the view is in partial cross-section and partial phantom.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefor, specific structural and functional details disclosed herein are not to be interpreted as limiting, but merely as a basis for the claims and as a representative basis for teaching one skilled in the art to variously employ the present invention in any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. This terminology will include these words, specifically mentioned derivatives thereof, and words of similar import.

Figure 26:
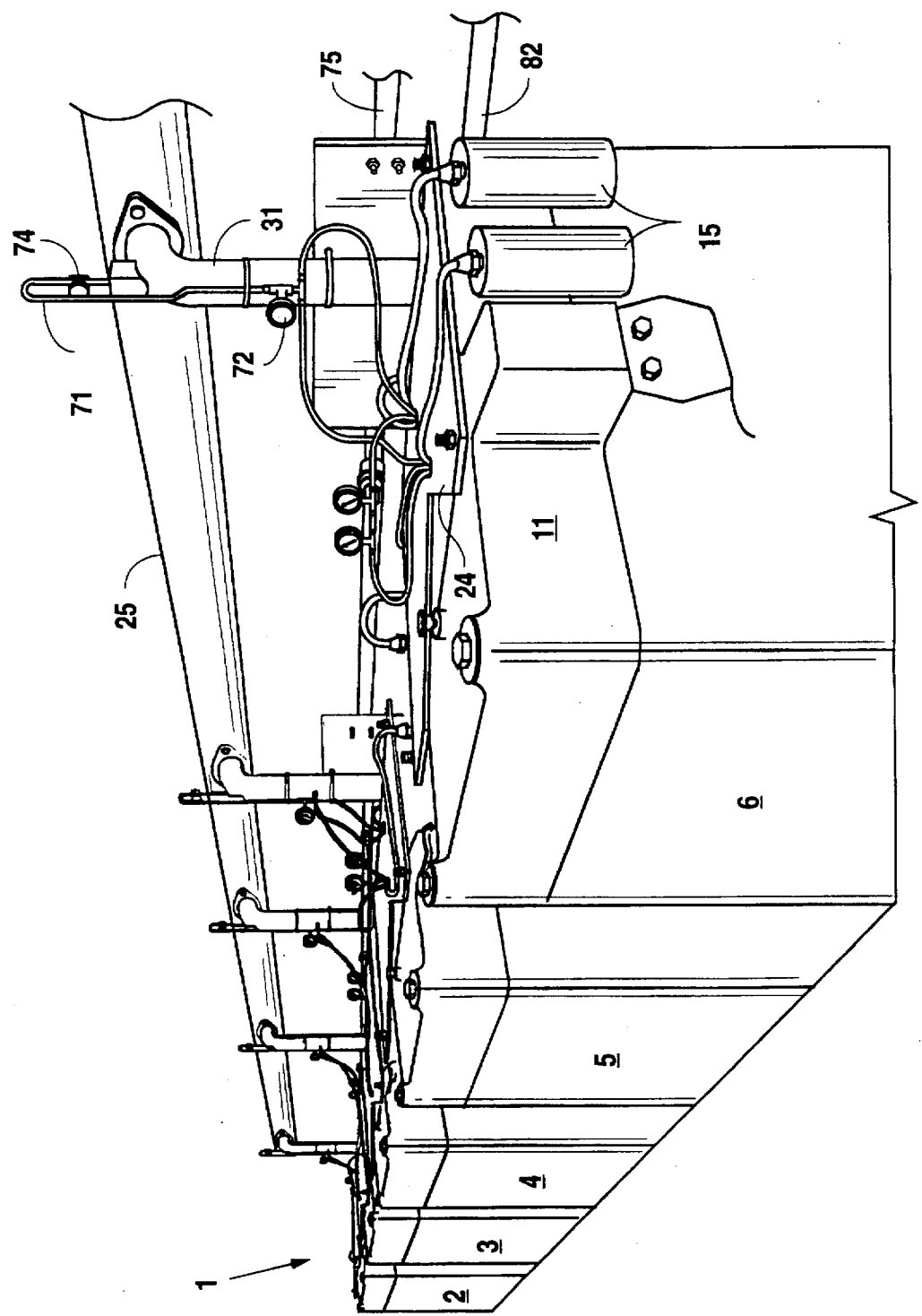
FIG. 26 is a perspective view of a multi-cylinder natural gas fired internal combustion engine illustrating at least partial modification in accordance with the present invention.
Figure 30:
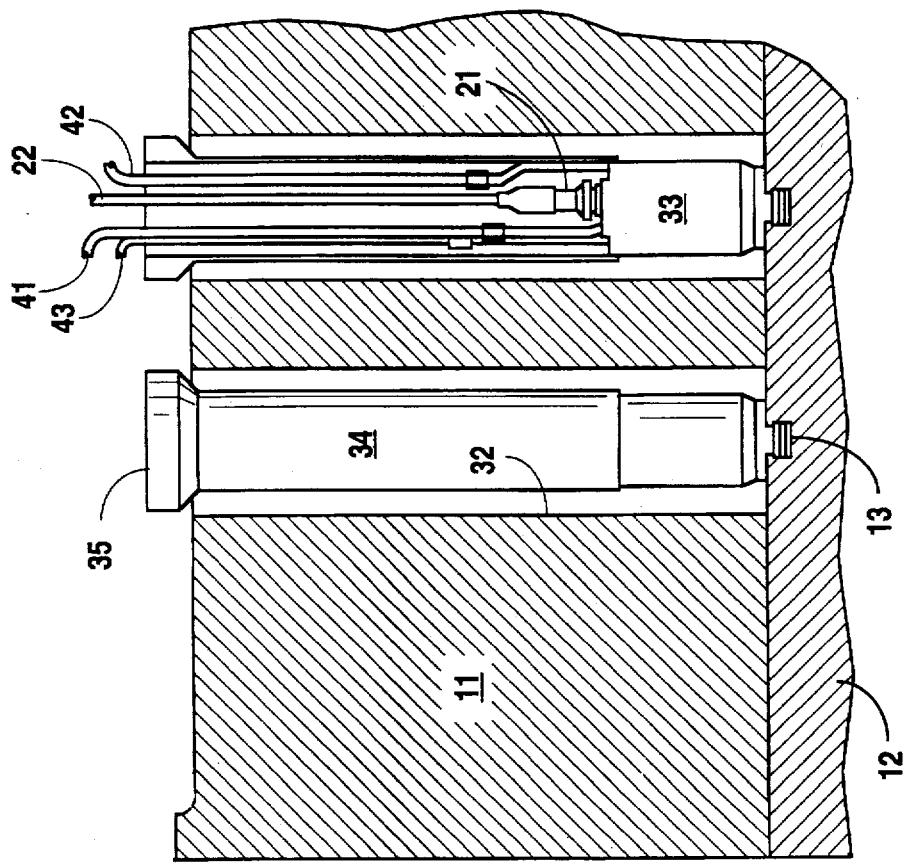
FIG. 30 is a further enlarged, fragmentary, cross-sectional view of the cylinder of FIG. 29, taken generally along line 3—3 in FIG. 29, with one pre-combustion chamber sleeve shown partially broken away to illustrate the interior thereof.

Referring to the drawings for more detail, FIG. 1 illustrates a schematic version of a typical internal combustion engine cylinder 2 having a containing cylinder wall 7 that defines an interior space 8 of the cylinder 2. A reciprocating power piston 150 is located at a bottom end of the cylinder 2. The piston 150 moves upward and downward within the cylinder wall 7 decreasing and increasing the interior space 8 respectively. An air inlet 155 is provided proximate to the bottom end of the cylinder 2 through which air 9 is introduced into the interior space 8. The generally upward movement of the air 9 is illustrated during an upstroke of the power piston 150. A jet pattern of fuel 10 is shown being introduced into the cylinder 2 through an injection valve assembly 100. A pre-combustion chamber 33 is shown that is in fluid communication, as is illustrated in FIG. 30, with the interior space 8 of the cylinder 2. A ball check valve assembly 200 is shown connected in-line with a pilot or pre-combustion chamber fuel line 41. It should be understood that both the injection valve assembly 100 and the pre-combustion chamber fuel line 41 are each fluidly connected to a fuel source that is illustrated in FIG. 26 as overhead natural gas line 25. While each is connected to the main gas line 25, there are at least two feed lines, one for each component, that may be individually regulated, at least with respect to delivery pressure.

Regarding the injection valve assembly 100, the fuel source 25 is fluidly connected to gas reservoir 106 that is created between an injection valve cartridge 103 and an interior wall 104 of a bored housing 104 within which the injection valve assembly 100 is installed. The fuel source 25 must have sufficient pressure to meet the demands of the injection valve assembly 100 and the pre-combustion chamber 33, or the pressure will have to be elevated to a suitable level. In most cases, a pressure of 45 psi will be minimally required, but the requirement may exceed 75 psi, or more.

Figure 2:
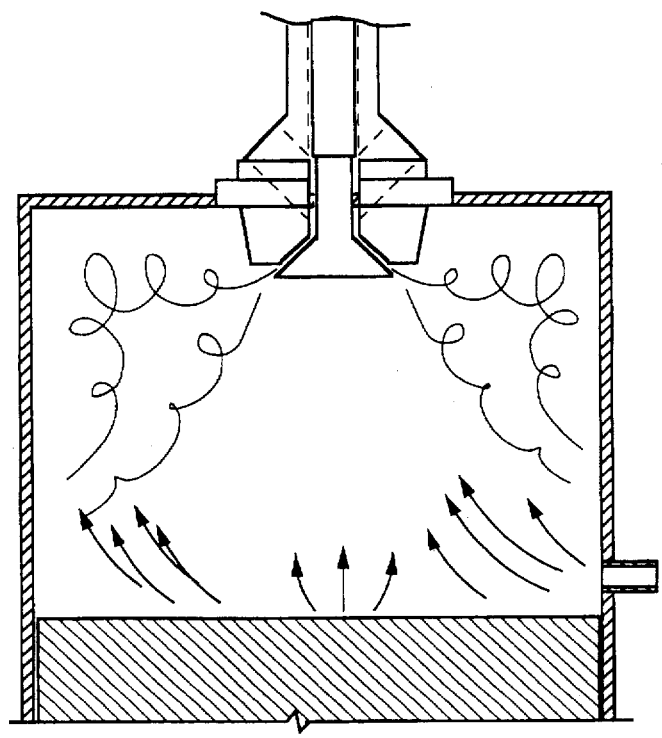
FIGS. 2 and 4 are schematic illustrations of a known injection valve assembly and its fuel distribution effects within an engine's cylinder.
Figure 3:
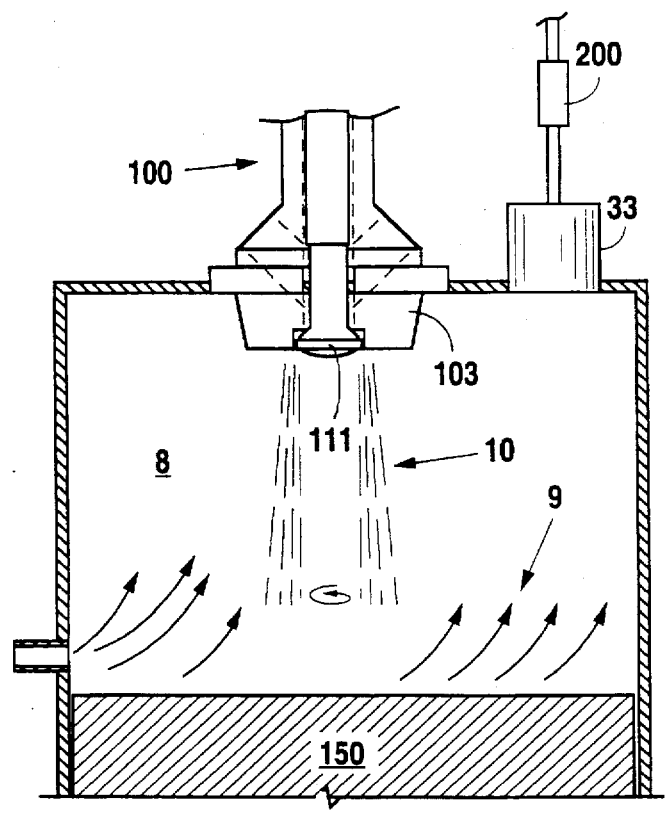
FIG. 3 is a schematic illustration of an improved injection valve assembly having an annulus passage and concentrated "jetting" fuel distribution effects within an engine's cylinder.
Figure 4:
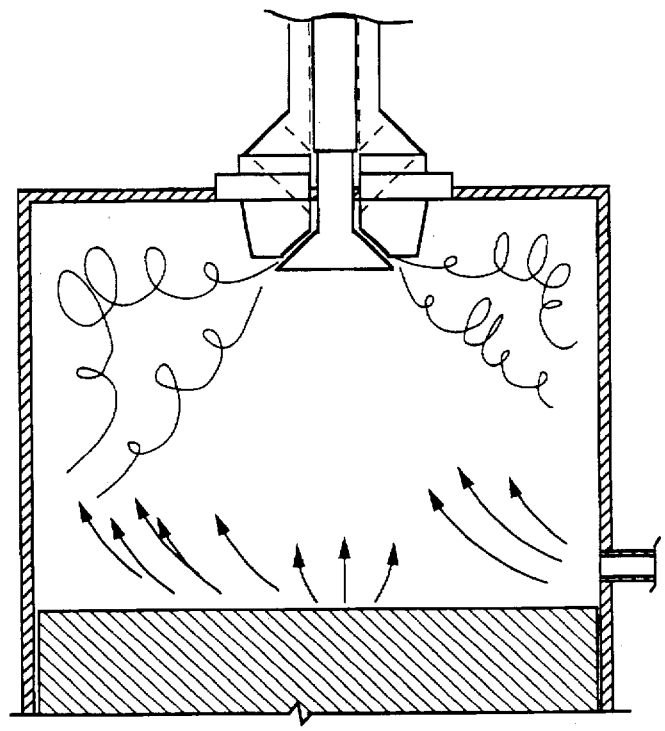
Figure 5:
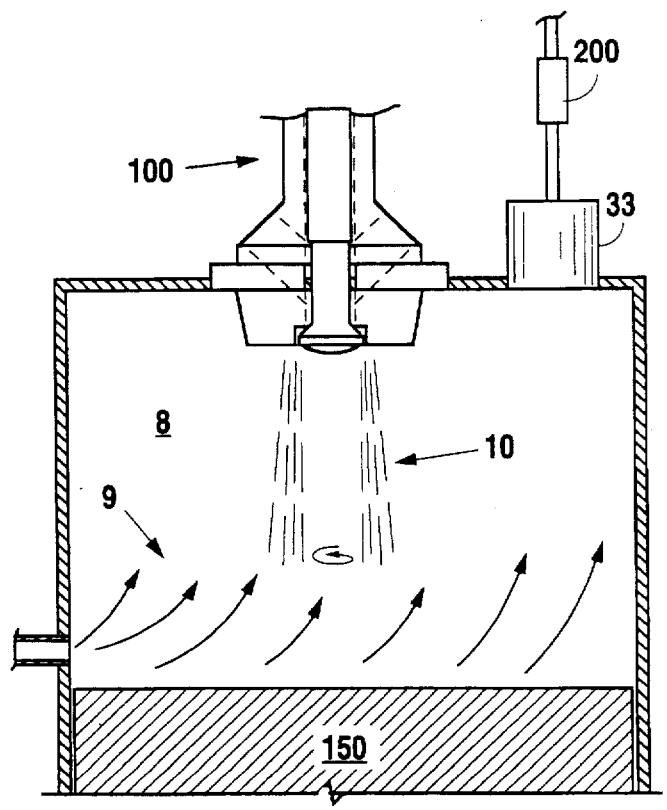
FIG. 5 is a schematic illustration of an improved injection valve assembly having a flared passage and broadcasted "jetting" fuel distribution effect within an engine's cylinder.
Figure 8:
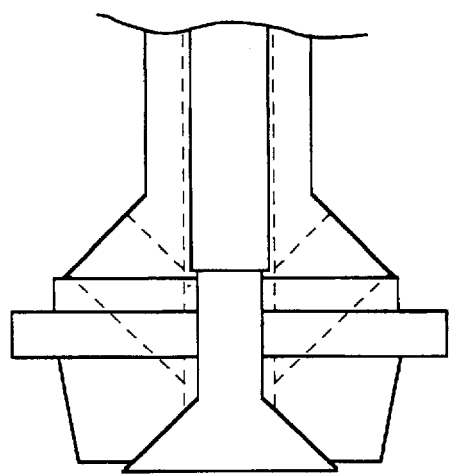
FIG. 8 is an illustration of a known design for an injection valve assembly having an injection valve piston installed within a known design for an injection valve cartridge and in a closed position during which fuel gas is prevented from passing.
Figure 9:
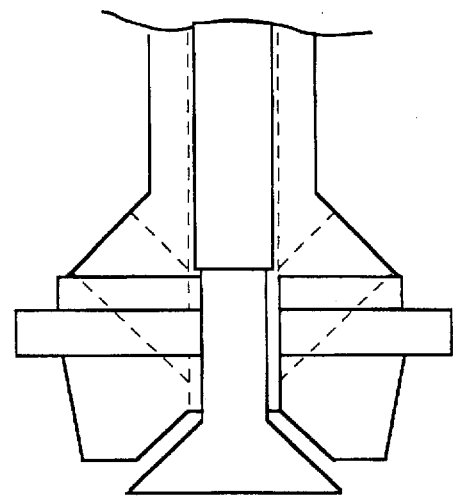
FIG. 9 is an illustration of the known design for an injection valve assembly of FIG. 8 in a open position during which fuel gas is permitted to pass therethrough.

FIG. 1 illustrates the mixing between the fuel 10 and air 9 that is promoted by the jetting effect of the fuel 10 prior to ignition by the pre-combustion chamber 33. FIGS. 2 and 4 are illustrative of the effects of a previously known injection valve assembly while FIGS. 3 and 5 show alternative embodiments of the injection valve assembly 100 of the present invention. The improved embodiments are illustrated adjacent to the previously known system to emphasize the jetting patterns 10 developed therein, together with the spinning cyclonic (rotational) effect that is imparted by the canted gas supply channels 112 that will be more fully described with respect to FIGS. 12 and 13.

Figure 10:
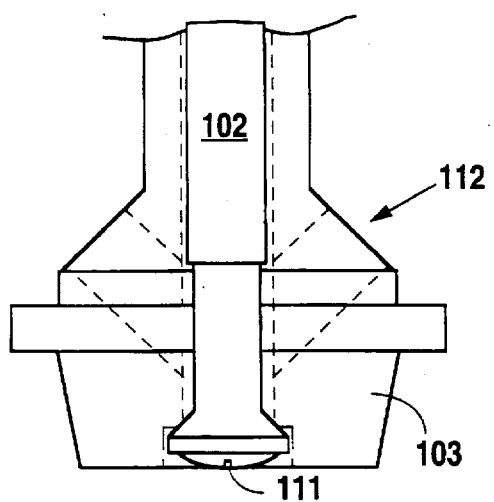
FIG. 10 is an illustration of the improved injection valve assembly in a closed position and in which an annulus is established between the lower distal end, or head of the injection valve piston and the injection valve cartridge.
Figure 11:
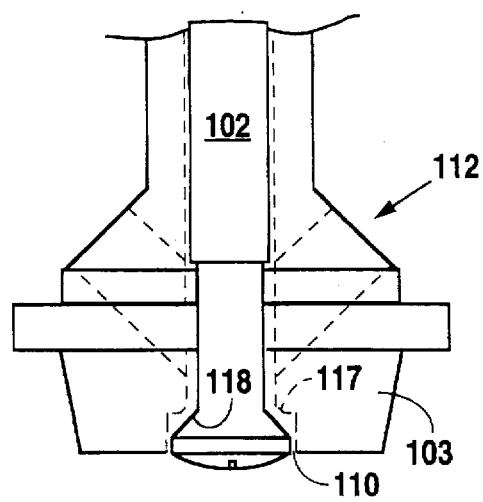
FIG. 11 is an illustration of the improved injection valve assembly of FIG. 10 in an open position.

The configuration of injection valve 100 as illustrated in FIG. 3 includes an injection valve piston 102 having a reduced diameter head 111 that may be completely recessed into a cartridge bore recess 120 located in the lower portion of a center bore 113 of the injection valve cartridge 103. The exterior surface of the piston head 111 and the interior surface of the recess 120 of the cartridge center bore 113 define an annulus 110 therebetween when the piston 102 is extended to an open position as illustrated in FIG. 11. In the open configuration of FIG. 11, the passage created through the annulus 110 establishes a gas port 105 through which the fuel gas is jetted into the engine cylinder 2. When in the closed position of FIG. 10, the exterior surface of the piston 102 engages the interior surface of the cartridge 103 thereby establishing a seal therebetween.

The alternative embodiment of FIG. 5 illustrates a flared configuration of the gas port 105. When gas is delivered therethrough, a jetting pattern is developed, but instead of focused in a generally downward beam as is produced by the embodiment of FIG. 3, the jet pattern 10 is more of a broadcast nature. Like the jet stream 10 of FIG. 3, a cyclonic spin is induced that further assists in the turbulent mixing of the fuel 10 and air 9.

FIG. 6 is a side view of the valve piston 102, broken at its mid-section, to indicate that the length of the piston 102 may vary significantly, based on its application. The head 111 of the piston 102 is located at a distal lower end and is semi-bulbous in that it enlarges from a reduced diameter 114 of a shaft 101 of the piston 102. The reduced diameter 114 also creates an expanded annulus space between the piston shaft 101 and the cartridge 103. Located at a top end of the piston 102 is an o-ring recess 107. An elastomeric o-ring may be installed therein for sealing engagement with an interior surface of the center bore 113 of cartridge 103. The extreme top end 121 of the piston shaft 101 is adapted for engagement with an opening actuator and/or closing spring. As illustrated, the engagement end of the piston 102 may be threaded and a screw driver slot may be oppositely provided at the head 111 to facilitate the piston's 102 connection to the actuator. As described herein, the piston 102 is depressed downwardly with respect to the cartridge 103 into an open position by a suitable actuator that may take the form of a rocker arm driven by a rotating cam shaft. At other times, the piston 102 is urged upwardly to a closed position by a biasing member that may suitably take the form of a spring.

FIG. 7 is an illustration of the injection valve cartridge 103. Like the piston 102 in FIG. 6, the cartridge 103 is broken to indicate that its length may vary depending upon its application. The exterior orifice 116 of one gas supply channel 112 is shown, while two other channels 112 are depicted by dashed lines to show their downwardly slant through a head 109 of cartridge 103. Similarly, the center bore 113 of the cartridge 103 is shown by dashed lines. A circumferential flange 115 is shown located about the lower end of the cartridge 103. Referring back to FIG. 1, the orientation of the cartridge 103 may be seen installed within the bored housing 103. When installed, a gas reservoir 106 is created between a reduced diameter portion of a cartridge shaft 108 and bored housing 104. The down pipe 31 is fluidly connected to the bored housing 103 with access to the reservoir 106. Fuel gas is supplied to the injection valve assembly 100 through pipe 31 where it is pooled in reservoir 106 until allowed to flow into the engine cylinder 2 through the channels 112 when the piston 102 is depressed and the gas port 105 is opened.

Figure 12:
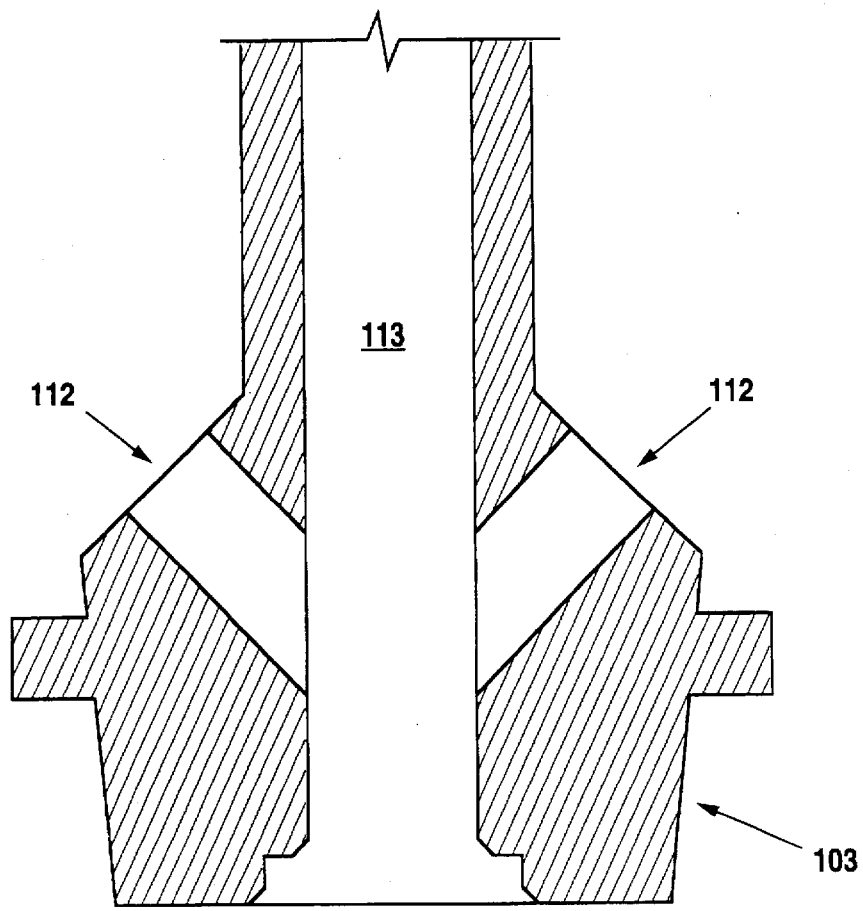
FIG. 12 is a cross-sectional view of the head of the injection valve cartridge.

FIG. 12 is an enlarged cross-sectional illustration of the lower end of the cartridge 103, particularly the head 109. Therein, an embodiment having a hybrid configuration of those shown in FIGS. 3 and 5 is illustrated. A lower end of the bore 113 of the cartridge 103 has a cylindrical portion that would create an annulus about the head 111 of the piston 102 and a flared portion that conforms to the flare of the piston head 111.

Figure 13:
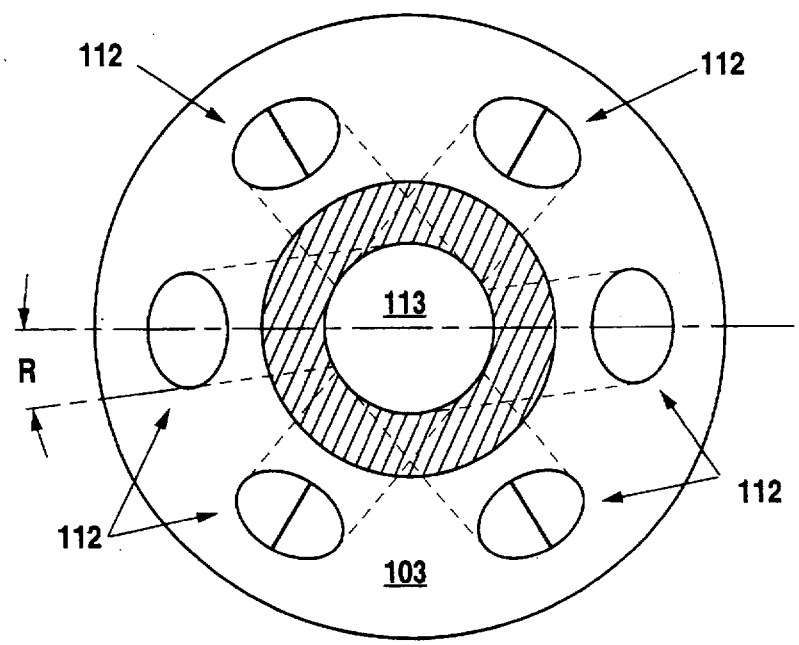
FIG. 13 is a schematic illustration of the head of the injection valve cartridge showing the gas supply channels canted at a slight angle from perpendicular to the centerline, or longitudinal axis of the injection valve assembly.

FIG. 13 is a cut-away view illustrating the canted and slanted configuration of the gas supply channels 112. As has been previously described, the channels 112 are uniformly canted off of a true radial axis and slanted downward to induce the cyclonic or spiral effect in the jet pattern of fuel 10. In the illustrated embodiment, the channels 112 are canted at a six degree angle off of radial.

FIG. 26 generally designates a large, five cylinder natural gas fueled internal combustion engine 1 that has been adapted to include the pre-combustion chambers 33, the modified injection valve assemblies 100, and the ball check valve assemblies 200 included of the present invention. The engine 1 includes cylinders 2–6, each of which is substantially identical. Thus, only cylinder 6, the right-most cylinder in FIG. 26, will be described in detail.

Figure 29:
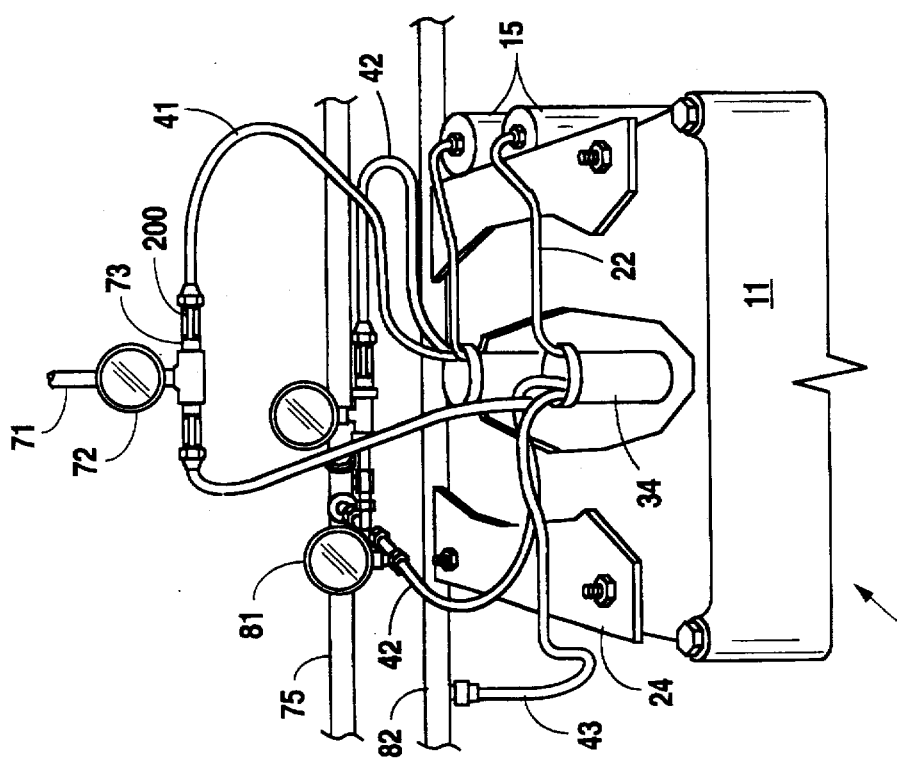
FIG. 29 is an enlarged top front perspective view of a single cylinder from the engine of FIG. 26, with portions broken away to illustrate a pair pre-combustion chamber sleeves positioned therein.

Referring to FIGS. 26, and 29–30, the cylinder 6 conventionally includes a valve cover 11 covering a number of intake and exhaust valves (not shown) in the top of a cylinder head 12. The cylinder head 12 is equipped with dual threaded spark plug bores 13 in the top thereof which communicate with the interior of the cylinder 6. A pair of conventional ignition coils 15 provide ignition sparks for a corresponding pair of spark plugs 21 via leads 22. A protective cover plate 24 may optionally be bolted over a portion of the valve cover 11. Fuel for the cylinder 6 is provided via the overhead natural gas line 25 and a down pipe 31. Access to the spark plugs 21 is provided via a pair of spark plug access bores 32 in the valve cover 11.

Each cylinder of the engine 1, including the cylinder 6, has been modified to include a pair of generally cylindrical pre-combustion chambers 33. Each pre-combustion chamber 33 is attached to an elongate sleeve 34, which sleeves 34 include a flared top portion 35 which can act as a handle when installing or removing the sleeve 34 and attached pre-combustion chamber 33. The elongate sleeves 34 and the pre-combustion chambers 33 are positioned entirely within the spark plug access bores 32, which, in some engines, must be made slightly oversized. The sleeves 34 are sized to accommodate the spark plug lead 22, a pre-combustion fuel line 41, a cooling water supply line 42 and a cooling water return line 43.

Figure 27:
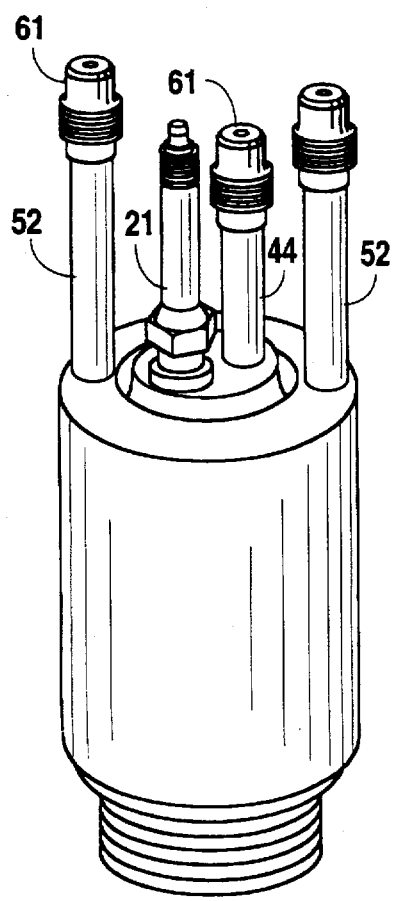
FIG. 27 is an enlarged perspective view of a pre-combustion chamber in accordance with the present invention.
Figure 28:
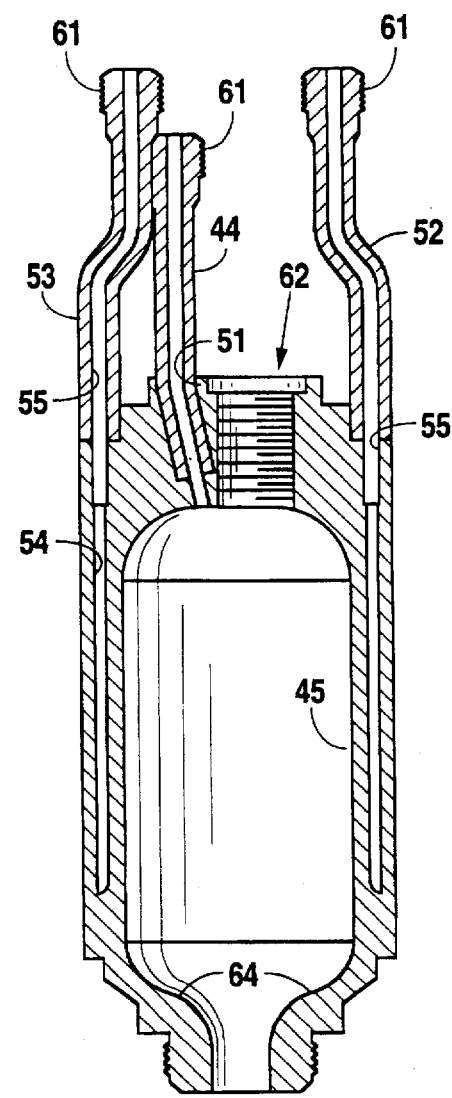
FIG. 28 is a cross-sectional view of the pre-combustion chamber.

Referring to FIGS. 27 and 28, each pre-combustion chamber 33 includes a fuel line supply tube 44 which communicates with an interior chamber 45 via a bore 51. A cooling water supply tube 52 and cooling water return tube 53 each communicate with a narrow cooling water reservoir 54, which is basically concentric with and completely surrounds the interior chamber 45. A pair of graduated bores 55 and 56 connect the reservoir 54 with the tubes 52 and 53, respectively. Each of the tubes 44, 52 and 53 includes a threaded adaptor 61 which connects to the respective water or fuel line. The adaptors 61 can be sized or threaded differently to prevent inadvertent connection of the wrong fuel or water lines.

A threaded spark plug bore 62 is positioned in the top of the pre-combustion chamber 33 and allows the spark plug 23 threaded therein to communicate with the interior chamber 45. The interior chamber 45 includes rounded corners 63 and 64 at the top and bottom thereof, respectively, to aid in the smooth flow of fuel and air therethrough.

To adapt the engine 1 to include the inventive clean burning pre-combustion chamber system, a pre-combustion chamber down fuel line 71 is initially attached to the respective fuel down pipe 31 for each cylinder 2–6. A fuel pressure gauge 72 is attached to each fuel line 71 and the fuel supply lines 41, one each for the chambers 33 is attached to the respective pressure gauge via a fitting 73. Note that a single pressure gauge 72 can be used to supply fuel to both pre-combustion chambers 33 in each cylinder. A fuel shut-off valve 74 is installed between each pressure gauge 72 and the respective down pipe 31.

A cooling water supply pipe 75, positioned near the engine 1, is connected to a source of water under pressure, such as a coolant boost pump (not shown), and one or more cooling water pressure gauges 81 are connected to the supply pipe near each cylinder. The cooling water supply line 42 for each pre-combustion chamber 33 is connected to a respective water pressure gauge 81. Alternatively, as per the fuel lines 41, a single pressure gauge 81 can supply cooling water to both pre-combustion chambers 33 in each cylinder. A cooling water return pipe 82 is also positioned near the engine 1 and the cooling water return line 43 for each cylinder is connected to the return pipe 82.

The two ignition spark plugs 21 in each cylinder head are then removed via the access bores 32. Next, the combined pre-combustion chamber 33 and attached sleeve 34, with cooling water supply and return lines 42 and 43, respectively, and fuel supply line 41 attached, are threadably inserted into the spark plug bores 13 via the access bores 32.

The spark plugs 21 are then threaded into the bores 62 in the tops of each of the pre-combustion chambers 33 and spark plug leads 22 run between the coils 15 and the spark plugs 21.

Together with the pre-combustion chamber 33, the ball check valve 200 may be optionally included in-line with the fuel line 41. The check valve 200 is illustrated in FIGS. 14–25. Referring to FIG. 14, the entire check valve assembly 200 may be seen in an exploded cross-sectional view. A check valve body 201 may be seen that includes an aperture or orifice 206 drilled therethrough and which is sized to supply pilot fuel to the pre-combustion chamber 33 in a manner and amount that optimizes the chamber's 33 performance. Each different chamber 33 may have a correspondingly sized check valve orifice 206. A gasket 202, spacer 203, and silicon nitride ball 204 are then installed, in order, into a cavity 207 of the check valve body 201. A connector 205 is then threadably connected to the check valve body 201 thereby securing the gasket 202, spacer 203, and ball 204 within the body's 201 cavity 207. The spacer 203, together with the connector 205 create a cage 208 within which the ball 204 is trapped. The connector 205 is lapped on an inner face to form a seal with the ball 204 upon abutting engagement. In practice, a seat upon which the ball seals is a fifteen degree seat and must hold a ten inch mercury (hg) vacuum when in the sealed configuration. The spacer 203 is also lapped to adjust the lift of the check ball 204 to assure proper opening through the assembly 200. The gasket 202 is preferably constructed from copper and seals between the spacer 203 and the body 201. In operation, the ball is allowed to move within the cage 208 depending upon the direction of the gas pressure differential across the body 201. When the pressure is greater at the pre-combustion chamber 33 than at the fuel source 25, the ball 204 moves toward the interior end of the connector 205 and sealingly seats thereupon thereby restricting flow. When the pressure is greater at the fuel source 25 than at the pre-combustion chamber 33, the ball moves toward the chamber 33 and fuel is allowed to flow from the source 25 to the chamber 33.

It is anticipated that the valve assembly 100 of the present invention may be incorporated into any internal combustion engine cylinder 6. All that is required is that the head end of the assembly 100 be given access to the interior space 8 of the cylinder 6. In the preferred embodiment described herein, the assembly 100 is installed within an already existing housing 104 that is bored to provide a receiver for the assembly and that cooperates therewith. In the absence of such a housing 104, an enclosing sleeve could be utilized to establish a similar enclosure about the cartridge 103 to that created by the bore of the housing 104. The housing depicted in FIG. 1 could also represent such an enclosing sleeve. The clean burning modifications of the present invention can be installed on a variety of natural gas engines, including engines with top-mounted rocker arm covers and other engines such as the in-line Worthington UTC-165T engine illustrated in FIG. 26 with very little modification of the cylinder heads or valve covers.

In the embodiment described in detail hereinafter, the original piston 102 had been retained and operated within a substantially solid housing. Adaptation of the cylinder 6 to include the valve assembly 100 requires that the solid housing either have been previously bored, or be bored so that the assembly 100 may be installed therein. The cartridge 103 is installed within the bored housing 104 for sealing engagement therewith. A lower seal will typically be affected at or about the flange 115 and an upper seal may be formed by o-rings installed within the recesses 119 of an enlarged upper portion of the shaft 108 of the cartridge 103. Between the upper and lower sealed ends, the gas reservoir 106 is created between the cartridge 103 and the interior of the bored housing 104. The piston 102 may then be inserted into the center bore 113 of the cartridge 103, shaft end first through the head 109 of the cartridge 103. More typically, however, the piston 102 will have previously been installed and already retained within the cartridge 103 since to do otherwise would require that the piston 102 be installed from within the cylinder 6. When installed within the cartridge 103, the piston 102 maintains an upper dynamic seal between an upper end of the piston shaft 101 and the center bore 113 of the cartridge 103 with o-rings installed within the recesses 107 located thereon. In the configuration illustrated in FIGS. 10 and 11, a piston sealing surface 118 engages cartridge sealing seat 117 and a seal is established therebetween. In the sealed and closed configuration of FIG. 10, the channels 112, as well as an annulus between the piston shaft 101 and bore 113 of the cartridge 103 between the lower seal and upper o-ring seal serve as an extension of the gas reservoir 106.

The valve piston 102 may now be connected to its actuator for driven reciprocation within the cartridge 103. The pressurized fuel source 25 is then connected to the assembly 100 through down pipe 31 so that pressured fuel resides in the gas reservoir 106 ready for injection into the engine's cylinder 2 through gas supply channels 112 and gas port 105 upon depression of the piston 102.

The pre-combustion chambers 33, and optionally the check valves 200 may be installed, together with the injection valve assembly 100 may be installed upon an internal combustion engine's cylinder 6. Conversely, the injection valve assembly may be solely installed without inclusion of the pre-combustion chambers 33 or check valves 200. It is known that each improvement contributes beneficially to the performance of the internal combustion engine, however, and that their synergistic effects potentiate one another for superior performance results when included together.

In operation, the engine 1 stands ready with pressured fuel available to both the pre-combustion chambers 33 and the injection valve assemblies 100. The engine 1 is then normally cranked via a conventional air starter or a ring gear starter (not shown). Pilot fuel is introduced into each pre-combustion chamber fuel supply line 41 at a pressure greater than the normal engine cylinder intake manifold pressure. The fuel check valve 200 that is positioned within each fuel supply line 41 permits fuel to enter the pre-combustion chamber 33 when pressure in that cylinder 6 is less than the pressure within the fuel supply line 41. This occurs during engine downstrokes. The check valve 200 closes during engine upstrokes when the pressure in the chamber 33 is greater than the fuel supply line 41. The upstrokes cause a rich fuel-air mixture to be forced from each cylinder 6 up into the respective pre-combustion chambers 33 to supplement the pilot fuel already supplied to the pre-combustion chambers 33 via the fuel supply lines 41. Also during the upstroke of the power piston 150, pressured fuel is jetted into the cylinder 6 through the injection valve assembly and thoroughly mixed with the air contained therein. As previously discussed, this is accomplished by actuating the injection piston 102 to an open position for a specified amount of time. The piston 102 is then urged back to the closed position by a biasing member.

The spark plugs 21 then fire in a conventional fashion, igniting the rich fuel-air mixture within each pre-combustion chamber 33. This ignition thrusts a high velocity jet of flaming gas into the engine cylinder from each connected pre-combustion chamber 33. The more thoroughly mixed fuel/air solution is thereby ignited, yielding a substantially complete combustion of the fuel and minimal emissions of $NO_x$ gases, as well as other undesirable exhaust gases.

It is to be understood that while certain forms of the present invention have been illustrated and described herein, it is not to be limited to the specific forms or arrangement of parts described and shown.

What is claimed and desired to be secured by Letters Patent is as follows:

1. An injection valve assembly installable upon a cylinder of an internal combustion engine, said injection valve assembly comprising:

an injection cartridge sealingly installable within a bore of an outer housing;

an injection piston installable within a center bore of said cartridge for reciprocating relative motion therein and sealable engagement therewith, and said injection piston having a piston shaft and a piston head;

said cartridge center bore having a recess within which said piston head reciprocates between a closed position in which a sealing surface of said piston head sealingly engages a sealing seat of said cartridge and an open position in which said sealing surface of said piston head is disengaged from said sealing seat of said cartridge thereby forming a gas port through which supplied pressured gas may pass;

said cartridge recess and said piston head creating a substantially cylindrical annulus therebetween so that pressured gas passing through said gas port and said annulus is jetted in a concentrated fuel stream in a direction substantially parallel to a length of said injection assembly;

a plurality of gas supply channels extending downwardly from an exterior of said cartridge to said center bore of said cartridge; and said gas supply channels being uniformly canted from a radial orientation thereby causing pressured gas passing through said channels to have a rotational component imparted thereto so that the concentrated fuel jet stream delivered therefrom is cyclonic.

2. The injection valve assembly installable upon a cylinder of an internal combustion engine as recited in claim 1, wherein there are at least five gas supply channels.

3. The injection valve assembly installable upon a cylinder of an internal combustion engine as recited in claim 1, wherein each channel is canted at a six degree angle to a radial orientation.

4. The injection valve assembly installable upon a cylinder of an internal combustion engine as recited in claim 1, wherein said piston shaft has a reduced diameter adjacent to a lower end of said channels thereby establishing an expanded annulus space between said piston shaft and said cartridge at said channels to facilitate the passage of gas from said channels to said gas port.

5. The injection valve assembly installable upon a cylinder of an internal combustion engine as recited in claim 1, wherein said injection cartridge is configured to create a gas reservoir at an exterior surface of said cartridge and in fluid communication with said channels.

6. The injection valve assembly installable upon a cylinder of an internal combustion engine as recited in claim 1, said piston shaft further comprising:

a threaded top end for screwable engagement with an actuator for reciprocating said piston within said cartridge.

7. The injection valve assembly installable upon a cylinder of an internal combustion engine as recited in claim 1, said piston shaft further comprising:

an o-ring recess proximate to a top end of said piston for receiving an o-ring that slidingly and sealingly engages an interior surface of said cartridge during reciprocation of said piston within said cartridge.

8. An injection valve assembly installable upon a cylinder of an internal combustion engine, said injection valve assembly comprising:

an injection cartridge sealingly installable within a bore of an outer housing;

an injection piston installable within a center bore of said cartridge for reciprocating relative motion therein and sealable engagement therewith, and said injection piston having a piston shaft and a piston head;

said cartridge center bore having a recess within which said piston head reciprocates between a closed position in which a sealing surface of said piston head sealingly engages a sealing seat of said cartridge and an open position in which said sealing surface of said piston head is disengaged from said sealing seat of said cartridge thereby forming a gas port through which supplied pressured gas may pass;

said cartridge recess and said piston head creating a flared annulus therebetween so that pressured gas passing through said gas port and said annulus is jetted in a conical pattern away from said injection assembly into the engine's cylinder;

a plurality of gas supply channels extending downwardly from an exterior of said cartridge to said center bore of said cartridge; and said gas supply channels being uniformly canted from a radial orientation thereby causing pressured gas passing through said channels to have a rotational component imparted thereto so that the concentrated fuel jet stream delivered therefrom is cyclonic.

9. The injection valve assembly installable upon a cylinder of an internal combustion engine as recited in claim 8, wherein there are at least five gas supply channels.

10. The injection valve assembly installable upon a cylinder of an internal combustion engine as recited in claim 8, wherein each channel is canted at a six degree angle to a radial orientation.

11. The injection valve assembly installable upon a cylinder of an internal combustion engine as recited in claim 8, wherein said piston shaft has a reduced diameter adjacent to a lower end of said channels thereby establishing an expanded annulus space between said piston shaft and said cartridge at said channels to facilitate the passage of gas from said channels to said gas port.

12. The injection valve assembly installable upon a cylinder of an internal combustion engine as recited in claim 8, wherein said injection cartridge is configured to create a gas reservoir at an exterior surface of said cartridge and in fluid communication with said channels.

13. The injection valve assembly installable upon a cylinder of an internal combustion engine as recited in claim 8, said piston shaft further comprising:

a threaded top end for screwable engagement with an actuator for reciprocating said piston within said cartridge.

14. The injection valve assembly installable upon a cylinder of an internal combustion engine as recited in claim 8, said piston shaft further comprising:

an o-ring recess proximate to a top end of said piston for receiving an o-ring that slidingly and sealingly engages an interior surface of said cartridge during reciprocation of said piston within said cartridge.

15. A method of injecting fuel into a cylinder of an internal combustion engine to promote mixing of the injected fuel and air present in the cylinder for a more complete ignition of the fuel and air, said method comprising the following steps:

supplying pressured fuel to an injection valve assembly at a pressure of at least 30 psi;

passing said pressured fuel through an annulus of restricted cross-sectional area created between an injection piston and an injection cartridge;

jetting a stream of said pressured fuel away from said injection valve assembly and into said cylinder;

penetrating a phase of air that is present in said cylinder with said jet stream of pressured fuel;

mixing said pressured fuel turbulently with said air; and imparting a rotational component to said jet stream of pressured fuel so that a cyclonic effect is established as said jet stream progresses into the cylinder.

16. The method of injecting fuel into a cylinder of an internal combustion engine to promote mixing of the injected fuel and air present in the cylinder for a more complete ignition of the fuel and air as recited in claim 15, said method further comprising the following steps:

establishing a focused jet stream of pressured fuel; and directing said focused jet stream of pressured fuel away from said injection assembly in a direction substantially parallel to a length of said injection assembly.

17. The method of injecting fuel into a cylinder of an internal combustion engine to promote mixing of the injected fuel and air present in the cylinder for a more complete ignition of the fuel and air as recited in claim 15, said method further comprising the following steps:

establishing a flared jet stream of pressured fuel; and directing said flared jet stream of pressured fuel away from said injection assembly so that a conical shaped dispersion pattern is developed in said flared jet stream of pressured fuel as said stream progresses into the cylinder.

* * * * *